United States Patent
Foskey et al.

(10) Patent No.: US 11,214,362 B2
(45) Date of Patent: Jan. 4, 2022

(54) VIBRATION ISOLATION SYSTEMS FOR ADVANCING BLADE CONCEPT ROTORCRAFT

(71) Applicant: Textron Innovations Inc., Providence, RI (US)

(72) Inventors: Christopher Edward Foskey, Colleyville, TX (US); Frank Bradley Stamps, Colleyville, TX (US); Michael Reaugh Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 238 days.

(21) Appl. No.: 16/716,264

(22) Filed: Dec. 16, 2019

(65) Prior Publication Data

US 2020/0262549 A1 Aug. 20, 2020

Related U.S. Application Data

(63) Continuation of application No. 15/459,781, filed on Mar. 15, 2017, now abandoned.

(51) Int. Cl.
*B64C 27/00* (2006.01)
*B64C 27/22* (2006.01)
(Continued)

(52) U.S. Cl.
CPC ............ *B64C 27/001* (2013.01); *B64C 27/10* (2013.01); *B64C 27/22* (2013.01); *B64C 27/82* (2013.01);
(Continued)

(58) Field of Classification Search
CPC .............................................. B64C 2027/002
See application file for complete search history.

(56) References Cited

U.S. PATENT DOCUMENTS 3,514,054 A * 5/1970 Mard ...................... G01M 9/04
  244/17.27
3,635,427 A * 1/1972 Balke .................... B64C 27/001
  244/17.27
(Continued)

OTHER PUBLICATIONS

Advancing Blade Concept (ABC) Technology Demonstrator, Applied Technology Laboratory—U.S. Army Research and Technology Laboratories, Apr. 1981.
(Continued)

*Primary Examiner* — Joseph W Sanderson
(74) *Attorney, Agent, or Firm* — Lawrence Youst PLLC

(57) ABSTRACT

An advancing blade concept rotorcraft includes an airframe and a pylon assembly subject to vibration. The pylon assembly includes a dual rotor system having coaxially disposed top and bottom rotor assemblies that counter rotate relative to one another. The advancing blade concept rotorcraft includes a vibration isolation system including at least one pylon link coupled to the airframe and the pylon assembly. The pylon link includes a Liquid Inertia Vibration Eliminator unit operable to reduce transmission of the pylon assembly vibration to the airframe. The advancing blade concept rotorcraft includes active force generators adjacent to the pylon assembly. The active force generators include a first active force generator producing a force in a first direction and a second active force generator producing a force in a second direction to counteract multidirectional oscillations of the pylon assembly, thereby reducing vibration of the advancing blade concept rotorcraft.

20 Claims, 10 Drawing Sheets

(51) Int. Cl.
*B64C 27/10* (2006.01)
*B64C 27/82* (2006.01)

(52) U.S. Cl.
CPC .............. *B64C 2027/002* (2013.01); *B64C 2027/8236* (2013.01); *B64C 2027/8281* (2013.01)

(56) References Cited

U.S. PATENT DOCUMENTS

| | | | |
|---|---|---|---|
| 3,698,663 A * | 10/1972 | Balke | B64C 27/001 244/17.27 |
| 4,236,607 A | 12/1980 | Halwes et al. | |
| 4,720,060 A * | 1/1988 | Yana | B64C 27/001 188/379 |
| 4,974,794 A | 12/1990 | Aubry et al. | |
| 5,310,137 A * | 5/1994 | Yoerkie, Jr. | B64C 27/001 244/17.27 |
| 5,316,240 A | 5/1994 | Girard et al. | |
| 5,435,531 A | 7/1995 | Smith et al. | |
| 5,439,082 A | 8/1995 | McKeown et al. | |
| 5,788,182 A * | 8/1998 | Guimbal | B64C 27/001 244/17.11 |
| 6,009,983 A | 1/2000 | Stamps et al. | |
| 6,431,530 B1 | 8/2002 | Stamps et al. | |
| 7,648,338 B1 | 1/2010 | Welsh | |
| 7,719,416 B2 * | 5/2010 | Arms | G07C 5/085 340/539.1 |
| 7,857,255 B2 | 12/2010 | Pancotti et al. | |
| 8,328,129 B2 | 12/2012 | Smith et al. | |
| 8,499,907 B2 | 8/2013 | Smith et al. | |
| 8,840,062 B2 | 9/2014 | Smith et al. | |
| 9,145,946 B2 | 9/2015 | David et al. | |
| 9,249,856 B1 | 2/2016 | Lee et al. | |
| 9,254,914 B2 | 2/2016 | Hendricks et al. | |
| 9,365,294 B2 * | 6/2016 | Griffin | B64D 35/00 |
| 9,777,788 B2 * | 10/2017 | Lee | F16F 7/00 |
| 10,330,166 B2 * | 6/2019 | Lee | F16F 7/00 |
| 2002/0128072 A1 * | 9/2002 | Terpay | F16F 15/027 464/1 |
| 2008/0036617 A1 | 2/2008 | Arms et al. | |
| 2008/0142633 A1 | 6/2008 | McGuire et al. | |
| 2009/0321556 A1 | 12/2009 | Pancotti et al. | |
| 2010/0090055 A1 | 4/2010 | Smith et al. | |
| 2013/0105621 A1 | 5/2013 | Smith et al. | |
| 2013/0119591 A1 | 5/2013 | Lee et al. | |
| 2013/0270415 A1 | 10/2013 | Lee et al. | |
| 2014/0314563 A1 | 10/2014 | Mayrides et al. | |
| 2015/0125299 A1 | 5/2015 | Baskin et al. | |
| 2015/0136900 A1 | 5/2015 | Griffin et al. | |
| 2015/0139800 A1 | 5/2015 | Hendricks et al. | |
| 2015/0289056 A1 * | 10/2015 | Storm | F16F 15/007 381/71.4 |
| 2015/0308534 A1 | 10/2015 | Smith et al. | |
| 2016/0200432 A1 | 7/2016 | Darrow, Jr. et al. | |
| 2017/0225774 A1 | 8/2017 | Welsh et al. | |
| 2018/0038439 A1 * | 2/2018 | Lee | F16F 13/24 |

OTHER PUBLICATIONS

European Exam Report; Application No. EP 18155504.6; European Patent Office; dated May 31, 2018.
European Search Report; Application No. EP 18155504.6; European Patent Office; dated May 14, 2018.
Go et al., Performance and Vibration Analyses of Lift-Offset Helicopters, International Journal of Aerospace Engineering, vol. 2017, Jun. 15, 2017.
Hager, The Need for High Speed in Next Generation Rotorcraft, U.S. Army War College, Mar. 2012.
S-69 (XH-59A) Advancing Blade Concept Demonstrator, Sikorsky Archives, https://www.sikorskyarchives.com/S-69%20(XH-59A).php, Apr. 2012.

* cited by examiner

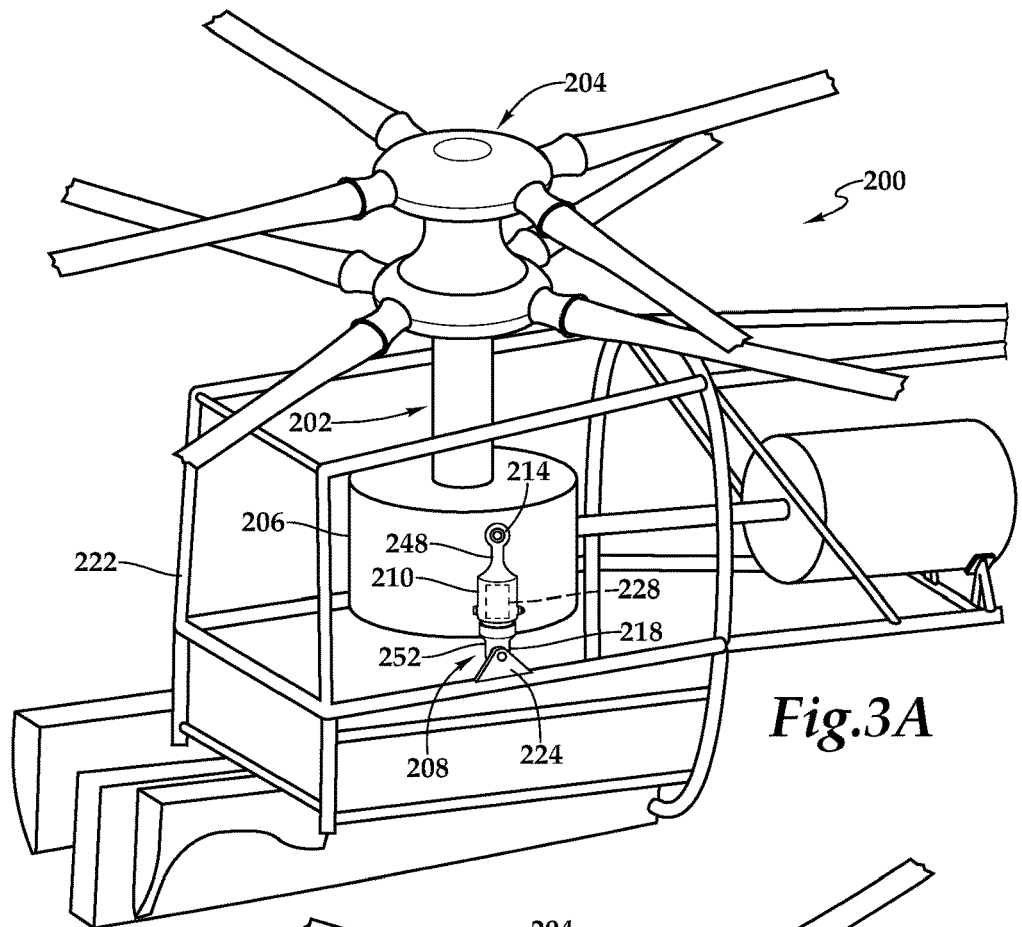
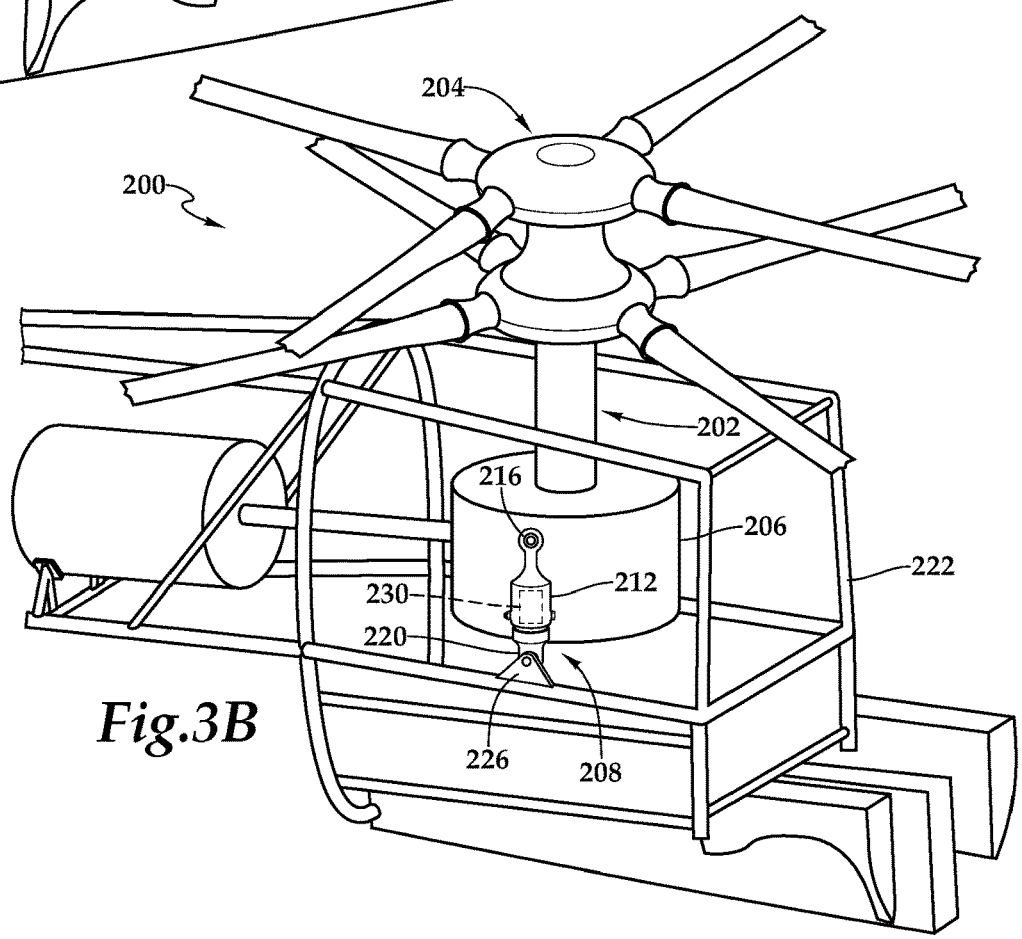

VIBRATION ISOLATION SYSTEMS FOR ADVANCING BLADE CONCEPT ROTORCRAFT

CROSS-REFERENCE TO RELATED APPLICATIONS

The present application is a continuation of co-pending application Ser. No. 15/459,781 filed Mar. 15, 2017.

TECHNICAL FIELD OF THE DISCLOSURE

The present disclosure relates, in general, to vibration isolation systems and, in particular, to vibration isolation systems for use on advancing blade concept rotorcraft.

BACKGROUND

Conventional, single rotor helicopters have a limited top speed due to the problem of retreating blade stall, in which the rotor blade on the retreating side of the rotor disc in forward flight experiences loss of lift due to the rotorcraft's linear forward flight velocity exceeding the rotor blade's minimum angular velocity for lift production. Attempts have been made to overcome retreating blade stall by utilizing an "advancing blade concept," in which one or more rotor blades advance on both sides of the rotorcraft during flight, allowing for a faster forward airspeed. In one implementation, advancing blade concept rotorcraft include two counter rotating rotors that provide advancing blades on both sides of the rotorcraft during flight. It has been found, however, that advancing blade concept rotorcraft are particularly susceptible to high amounts of vibration. For example, counter rotating rotors may combine harmonics in the wakes of one another, thereby creating excessive vibration in the fuselage of such rotorcraft. Fuselage vibration may be further exacerbated by the use of stiff high hinge offset rigid rotors, which may be present on some advancing blade concept rotorcraft.

The excessive vibration associated with advancing blade concept rotorcraft contributes to crew fatigue, increased maintenance, increased operating costs and structural instability. Attempts have been made to use active force generators to reduce fuselage vibration on advancing blade concept rotorcraft. It has been found, however, that active force generators add significant weight, have reliability and maintenance problems, generate high loads that contribute to structural fatigue, consume large amounts of power and have undesirable failure mode characteristics. Accordingly, a need has arisen for a vibration system that effectively prevents the transmission of vibration throughout an advancing blade concept rotorcraft while avoiding the negative characteristics of active force generators.

SUMMARY

In a first aspect, the present disclosure is directed to an advancing blade concept rotorcraft including an airframe and a pylon assembly subject to vibration. The pylon assembly includes a dual rotor system having coaxially disposed top and bottom rotor assemblies that counter rotate relative to one another. The advancing blade concept rotorcraft includes a vibration isolation system including at least one pylon link coupled to the airframe and the pylon assembly. The pylon link includes a Liquid Inertia Vibration Eliminator unit operable to reduce transmission of the pylon assembly vibration to the airframe. The advancing blade concept rotorcraft includes a plurality of active force generators adjacent to the pylon assembly. The active force generators include a first active force generator producing a force in a first direction and a second active force generator producing a force in a second direction different from the first direction to counteract multidirectional oscillations of the pylon assembly, thereby reducing vibration of the advancing blade concept rotorcraft.

In some embodiments, the counter rotating rotor assemblies may combine harmonics in the wakes of one another to emit a dual rotor system vibration frequency and the Liquid Inertia Vibration Eliminator unit may be tuned to cancel the dual rotor system vibration frequency originating from the dual rotor system. In certain embodiments, the pylon assembly may include a transmission and the pylon link may be coupled to the transmission. In some embodiments, the Liquid Inertia Vibration Eliminator unit may be a passive or active Liquid Inertia Vibration Eliminator unit. In certain embodiments, the Liquid Inertia Vibration Eliminator unit may include first and second fluid chambers, a tuning passage providing fluid communication between the first and second fluid chambers, a tuning fluid moveable between the first and second fluid chambers via the tuning passage to isolate the vibration of the pylon assembly, a housing and a piston disposed within the housing, the piston forming the tuning passage. In some embodiments, the piston may be operable to move within the housing such that the tuning fluid moves between the first and second fluid chambers via the tuning passage in response to the vibration of the pylon assembly.

In certain embodiments, the pylon link may include a first portion including a first end and a second portion including a second end, the first portion of the pylon link coupled to one of the housing or the piston and the second portion of the pylon link coupled to the other of the housing or the piston. In some embodiments, the pylon link may include at least one substantially horizontal pylon link and at least one substantially vertical pylon link. In certain embodiments, the pylon link may be a plurality of pylon links each including a respective Liquid Inertia Vibration Eliminator unit. In such embodiments, the pylon assembly may be subject to vibration in a plurality of degrees of freedom including first and second degrees of freedom, and the pylon links may include first and second pylon links, the first pylon link oriented to isolate vibration of the pylon assembly in the first degree of freedom, the second pylon link oriented to isolate vibration of the pylon assembly in the second degree of freedom. In some embodiments, the pylon links may include a plurality of substantially horizontal pylon links circumferentially disposed around the pylon assembly and a plurality of substantially vertical pylon links circumferentially disposed around the pylon assembly. In certain embodiments, the vertical pylon links may be circumferentially equidistant from one another. In some embodiments, the pylon links may include pairs of substantially horizontal pylon links and substantially vertical pylon links, each pair of horizontal and vertical pylon links forming an angle between 70 and 110 degrees. In certain embodiments, at least one of the horizontal pylon links may be angularly offset from a horizontal plane.

In some embodiments, the pylon link may include a torque restraint and fore/aft vibration isolation subsystem. In certain embodiments, the active force generators may be coupled to the airframe. In some embodiments, the active force generators may include at least one rotary active force generator. In certain embodiments, the first active force generator may produce a force in a vertical direction, the second active force generator may produce a force in a longitudinal direction and a third active force generator may produce a force in a lateral direction to produce forces to counteract the multidirectional oscillations of the pylon assembly, thereby reducing vibration of the advancing blade concept rotorcraft. In some embodiments, the advancing blade concept rotorcraft may include a pusher propeller having variable pitch blades configured to propel the advancing blade concept rotorcraft in a forward direction and a flight control system having a fly-by-wire architecture. In such embodiments, the top and bottom rotor assemblies may be rigid and/or variable speed rotor assemblies and the top and bottom rotor assemblies may each include four rotor blades. In certain embodiments, the advancing blade concept rotorcraft may include a tailboom including a downward fin and a horizontal stabilizer.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3B are isometric views of a vibration isolation system implemented on an advancing blade concept rotorcraft in accordance with embodiments of the present disclosure;

DETAILED DESCRIPTION

Figure 1A:
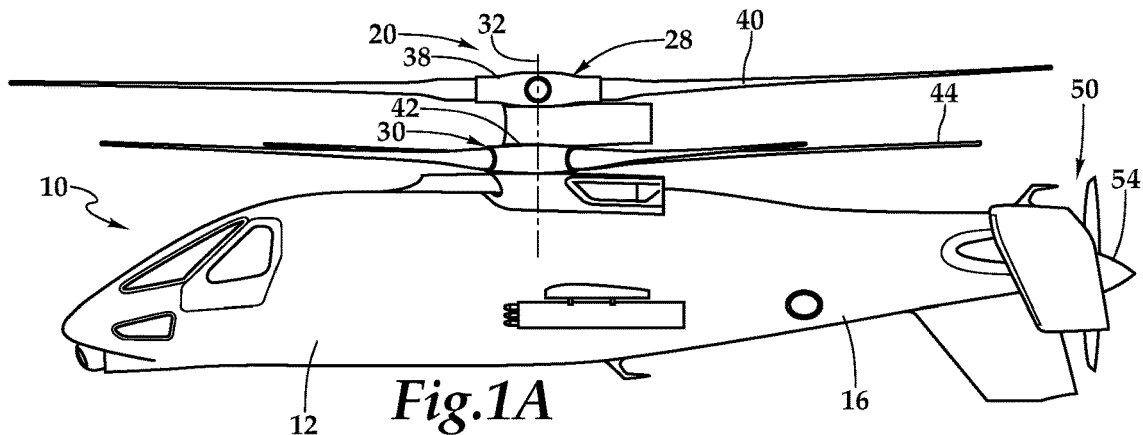
FIGS. 1A-1D are schematic illustrations of an advancing blade concept rotorcraft utilizing a vibration isolation system in accordance with embodiments of the present disclosure.
Figure 1B:
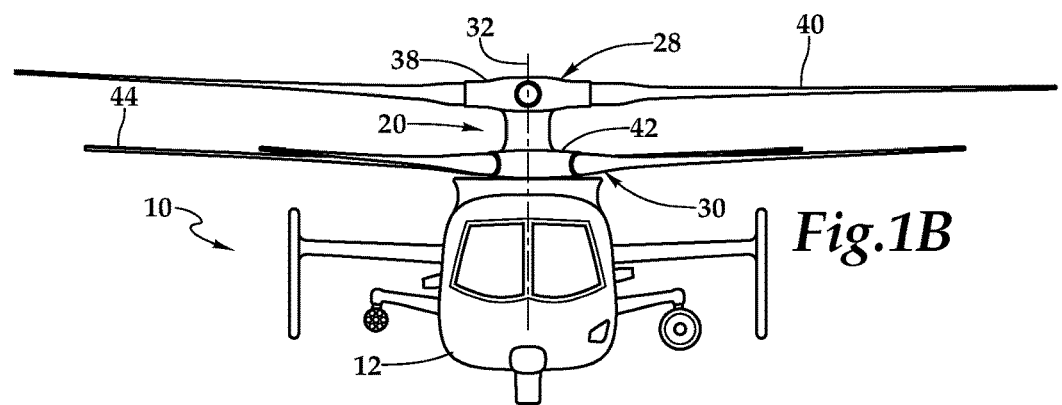
Figure 1C:
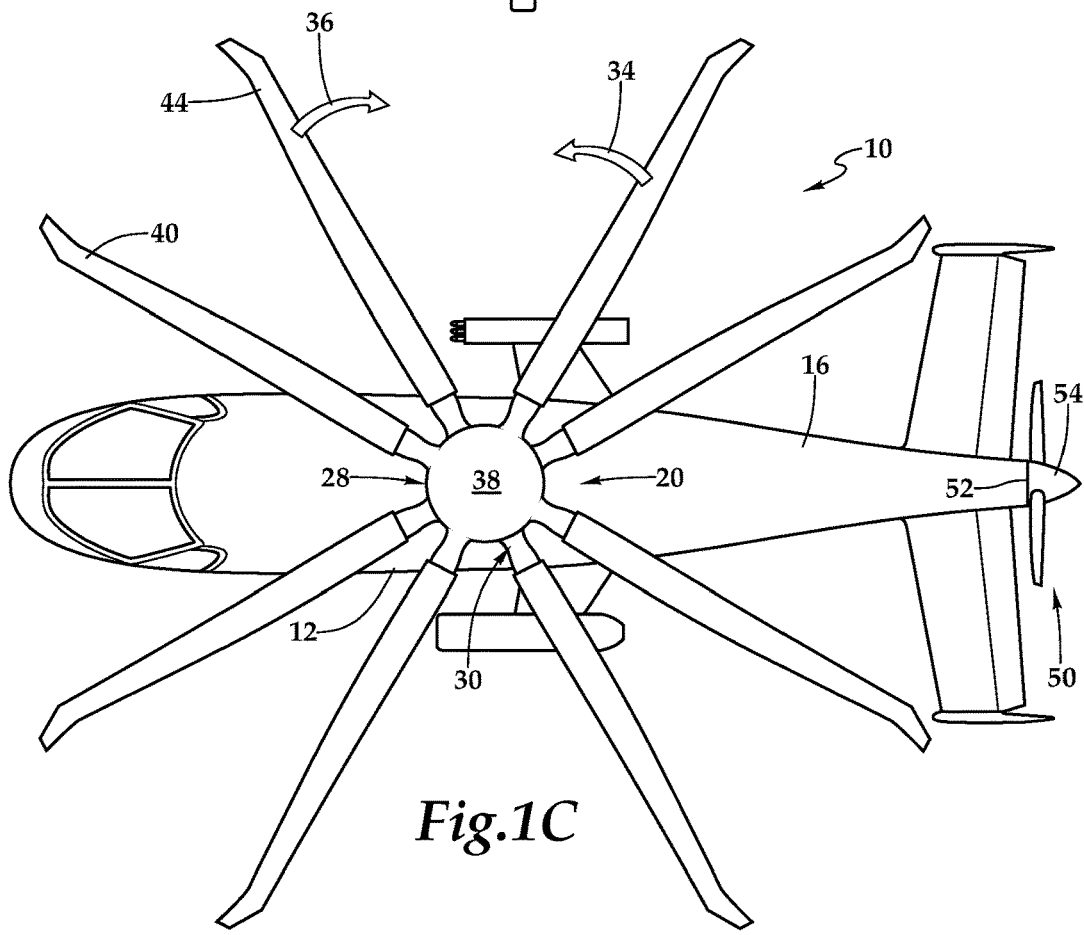
Figure 1D:
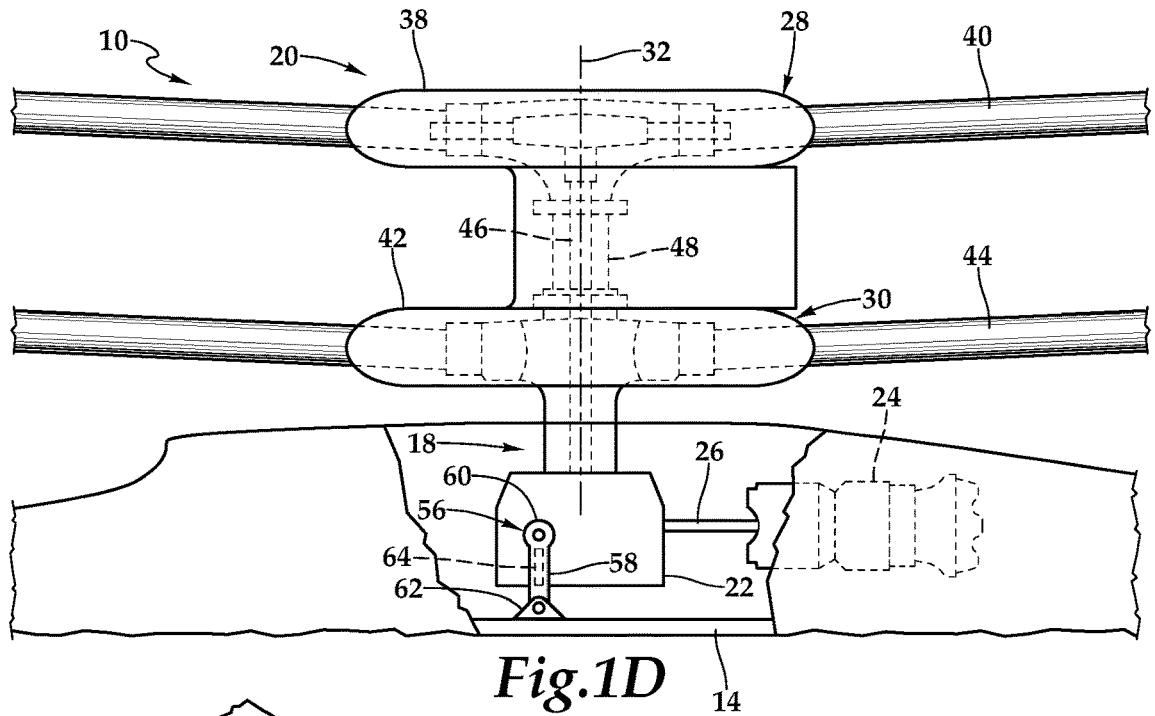

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A-1D in the drawings, an advancing blade concept rotorcraft capable of vertical takeoff and landing (VTOL) is schematically illustrated and generally designated 10. Advancing blade concept rotorcraft 10 includes a fuselage 12 supported by an airframe 14. A tailboom 16 extends aft of fuselage 12. Pylon assembly 18 includes a dual rotor system 20 and a transmission 22, or gearbox, which is powered by one or more engines 24 via a drive shaft 26. Dual rotor system 20 includes top and bottom rotor assemblies 28, 30 that counter rotate relative to one another about rotor axis 32. Top rotor assembly 28 is rotatable in a first direction 34 about rotor axis 32. Bottom rotor assembly 30 is rotatable in a second direction 36 about rotor axis 32, opposite to first direction 34. While first direction 34 is illustrated as counter-clockwise and second direction 36 is illustrated as clockwise in FIG. 1C, it will be appreciated that in some embodiments the directions of rotation of top rotor assembly 28 and bottom rotor assembly 30 may be reversed.

Top rotor assembly 28 includes top rotor hub assembly 38 from which a plurality of rotor blade assemblies 40 radially project outward. Similarly, bottom rotor assembly 30 includes bottom rotor hub assembly 42 from which a plurality of rotor blade assemblies 44 radially project outward. Top and bottom rotor assemblies 28, 30 may each include any number of rotor blade assemblies 40, 44. Top and bottom rotor assemblies 28 and 30 are also coaxial. In particular, top rotor hub assembly 38 is mounted to an upper rotor shaft 46. Upper rotor shaft 46 counter rotates within a lower rotor shaft 48, to which bottom rotor hub assembly 42 is mounted. Top and bottom rotor assemblies 28, 30 may be rigid, hingeless and/or stiff in plane. Rotor blade assemblies 40, 44 may be capable of collective and/or cyclic pitching is. It should be understood that various blade attachments may be utilized by advancing blade concept rotorcraft 10. Top and bottom rotor assemblies 28, 30 may be static or variable speed. In some embodiments, top and bottom rotor assemblies 28, 30 may be capable of tilting together in the same direction, or may tilt at different angles relative to one another.

Advancing blade concept rotorcraft 10 is a compound helicopter that includes translational thrust system 50 located at aft end 52 of tailboom 16. Translational thrust system 50 includes a pusher propeller 54 that propels advancing blade concept rotorcraft 10 in a forward direction. Assisted by pusher propeller 54, advancing blade concept rotorcraft 10 may be capable of high forward airspeed. By providing for propulsion for advancing blade concept rotorcraft 10, pusher propeller 54 may reduce the drag burden on dual rotor system 20. Pusher propeller 54 may be a variable pitch pusher propeller and may be clutchable. Pusher propeller 54 may be powered by engine 24 via a gearbox, such as transmission 22. While shown in the context of a pusher propeller configuration, it will be understood by one of ordinary skill that pusher propeller 54 may also be a more conventional puller propeller or could be variably facing so as to provide yaw control in addition to or instead of translational thrust.

Because pylon assembly 18 is subject to vibration, advancing blade concept rotorcraft 10 includes a vibration isolation system 56. Transmission 22 of pylon assembly 18 is mounted to airframe 14 by one or more pylon links 58. In particular, first end 60 of pylon link 58 is coupled to transmission 22 and second end 62 of pylon link 58 is coupled to airframe 14. As used herein, the term "coupled" may include direct or indirect coupling by any means, including moving and/or non-moving mechanical connections. Pylon link 58 includes a vibration isolator 64 such that vibration isolator 64 is interposed between pylon assembly 18 and airframe 14. Vibration isolator 64 intercepts vibrations between pylon assembly 18 and airframe 14 so as to reduce or prevent the transmission of pylon assembly vibration to airframe 14, thus preventing undesirable shaking, vibration or instability of fuselage 12.

Advancing blade concept rotorcraft 10 may utilize some or all aspects of X2 Technology™ by Sikorsky®, which may have a fly-by-wire architecture and include coaxial and counter rotating dual rotor system 20. It should be appreciated that advancing blade concept rotorcraft 10 is merely illustrative of a variety of aircraft that can implement the embodiments disclosed herein. Indeed, vibration isolation system 56 may be utilized on any aircraft that experiences vibration. Other aircraft implementations can include single rotor helicopters, hybrid aircraft, tiltrotor aircraft, tiltwing aircraft, quad tiltrotor aircraft, unmanned aircraft, gyrocopters, airplanes, jets and the like. As such, those skilled in the art will recognize that vibration isolation system 56 can be integrated into a variety of aircraft configurations. In addition, vibration isolation system 56 is not limited to controlling vibration between only pylon assembly 18 and airframe 14, and may be interposed between any two or more aircraft components to limit the transmission of vibration therebetween. It should be appreciated that even though aircraft are particularly well-suited to implement the embodiments of the present disclosure, non-aircraft vehicles and devices can also implement the embodiments.

Figure 2:
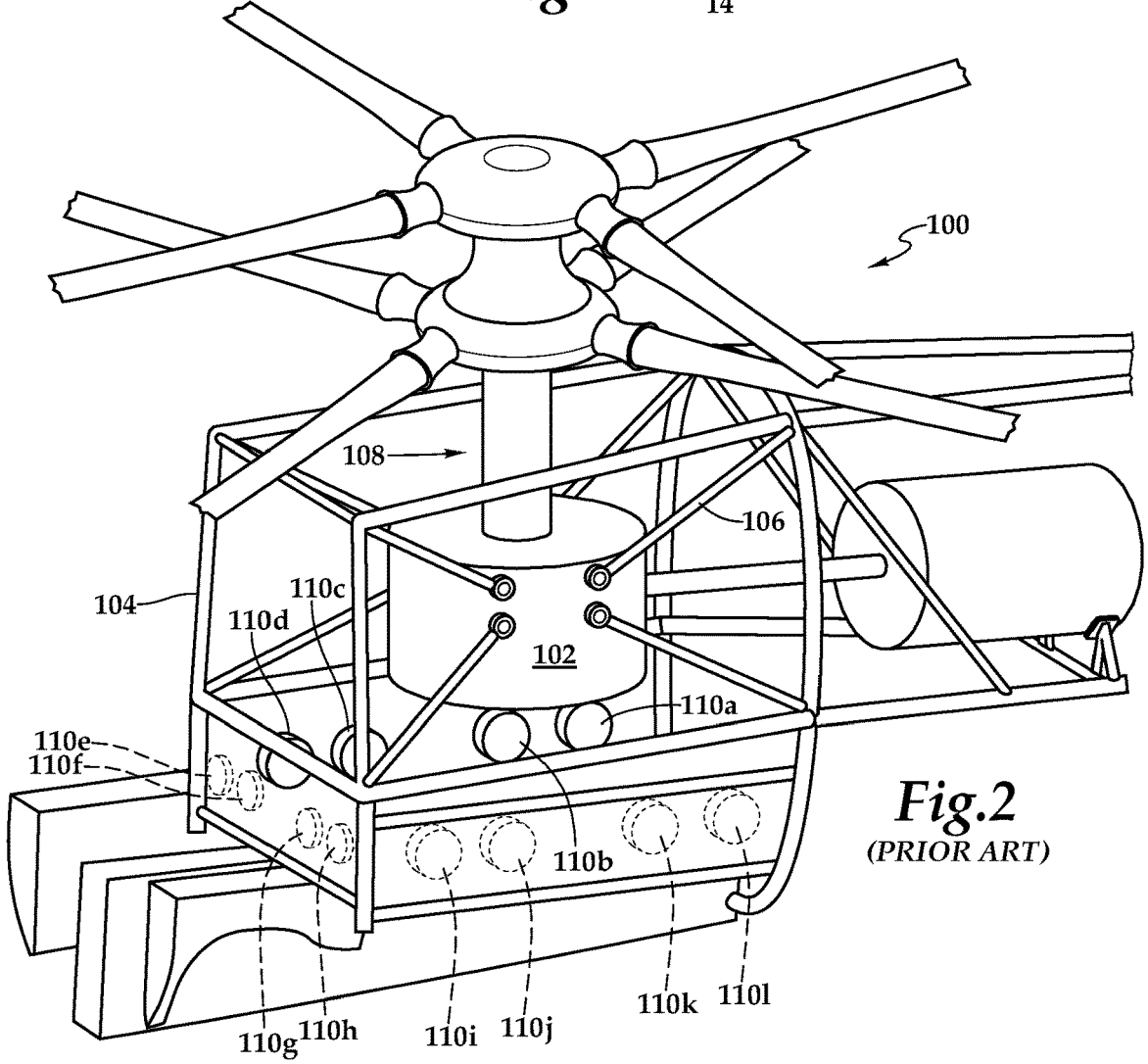
FIG. 2 is an isometric view of an advancing blade concept rotorcraft utilizing active force generators to reduce vibration.

Referring to FIG. 2 in the drawings, an active force generation system on an advancing blade concept rotorcraft is schematically illustrated and generally designated 100. Transmission 102 is rigidly bolted onto airframe 104. Rigid struts 106 are used to bolt transmission 102 to airframe 104. Because transmission 102 is rigidly attached to airframe 104, the vibration of pylon assembly 108 is freely transmitted to airframe 104. Previous advancing blade concept rotorcraft, such as rotorcraft utilizing X2 Technology™, have attempted to reduce rotorcraft vibration caused by pylon assembly 108 solely using active force generators, such as active force generators 110a-110l. Active force generators 110a-110l produce a force that is out of phase with the vibration of pylon assembly 108, thereby lowering the vibration in the remainder of the advancing blade concept rotorcraft, including airframe 104 and the fuselage. Active force generators 110a-110l produce forces in different directions to cancel the multidirectional oscillations of pylon assembly 108. In particular, active force generators 110a, 110b, 110f, 110g, 110k, 110l produce vertical forces, active force generators 110c, 110d, 110i, 110j produce forces in the longitudinal direction and active force generators 110e, 110h produce forces in the lateral direction. Among the types of active force generators 110a-110l that have been used to control vibration are active force generators manufactured by Moog® Inc.

Attempts to control vibration on advancing blade concept rotorcraft using active force generators, such as those in active generation system 100, has led to a number of problems. Because active force generators 110a-110l emit amplitudes that are opposite those of pylon assembly 108, the force amplitudes experienced by the advancing blade concept rotorcraft may be doubled, thereby increasing the fatigue on airframe 104 and other structures of the advancing blade concept rotorcraft. Active force generators 110a-110l contribute a significant weight penalty to the advancing blade concept rotorcraft due to the presence of an active damping mass as well as support structure, power generation components and controlling devices necessary for the operation of active force generators 110a-110l. The airframe substantiation required to structurally mount active force generators 110a-110l within the fuselage also contributes to the overall weight of active force generation system 100. Because active force generators 110a-110l are active electronically-controlled devices, they require an electronic feedback loop that may produce a delayed response when maneuvering through transient flight envelopes. Active force generators 110a-110l are also complex, expensive and have undesirable failure mode characteristics. For example, active force generation system 100 would cease to function if power to active force generators 110a-110l were compromised. These and other disadvantages of active force generation system 100 have brought about a need for an improved system for controlling the vibration in an advancing blade concept rotorcraft.

Referring to FIGS. 3A-3B and 4A-4B in the drawings, a portion of an advancing blade concept rotorcraft is schematically illustrated and generally designated 200. Advancing blade concept rotorcraft 200 has pylon assembly 202, which includes dual rotor system 204 and transmission 206. Advancing blade concept rotorcraft 200 includes vibration isolation system 208 to control the vibration of pylon assembly 202. Vibration isolation system 208 includes pylon links 210, 212. Ends 214, 216 of pylon links 210, 212 are pinned, bolted or otherwise coupled to transmission 206, respectively. Ends 218, 220 of pylon links 210, 212 are pinned, bolted or otherwise coupled to airframe 222, respectively. Ends 218, 220 of pylon links 210, 212 may be coupled to airframe 222 via pylon support fittings 224, 226, respectively. Pylon links 210, 212 each include vibration isolators 228, 230, respectively. Vibration isolators 228, 230 are interposed between pylon assembly 202 and airframe 222 to intercept the vibration of pylon assembly 202 before it reaches airframe 222. Vibration isolators 228, 230 attenuate, isolate or otherwise reduce transfer of mechanical or harmonic vibration, such as periodic vibration, between pylon assembly 202 and airframe 222. Thus, vibration isolators 228, 230 reduce or prevent the transmission of pylon assembly vibration to airframe 222, the fuselage and other parts of advancing blade concept rotorcraft 200. Reducing such vibration improves avionics, passenger comfort and electronic and structural component longevity. Non-limiting examples of rotorcraft vibrations of concern include a blade pass frequency and higher harmonics, among others. While vibration isolation system 208 is illustrated to include two pylon links 210, 212 that are each oriented vertically, vibration isolation system 208 may include any number of pylon links, each including a respective vibration isolator, and the pylon links may be configured in any combination of directions to reduce or prevent the vibration of pylon assembly 202 along multiple degrees of freedom.

Figure 4A:
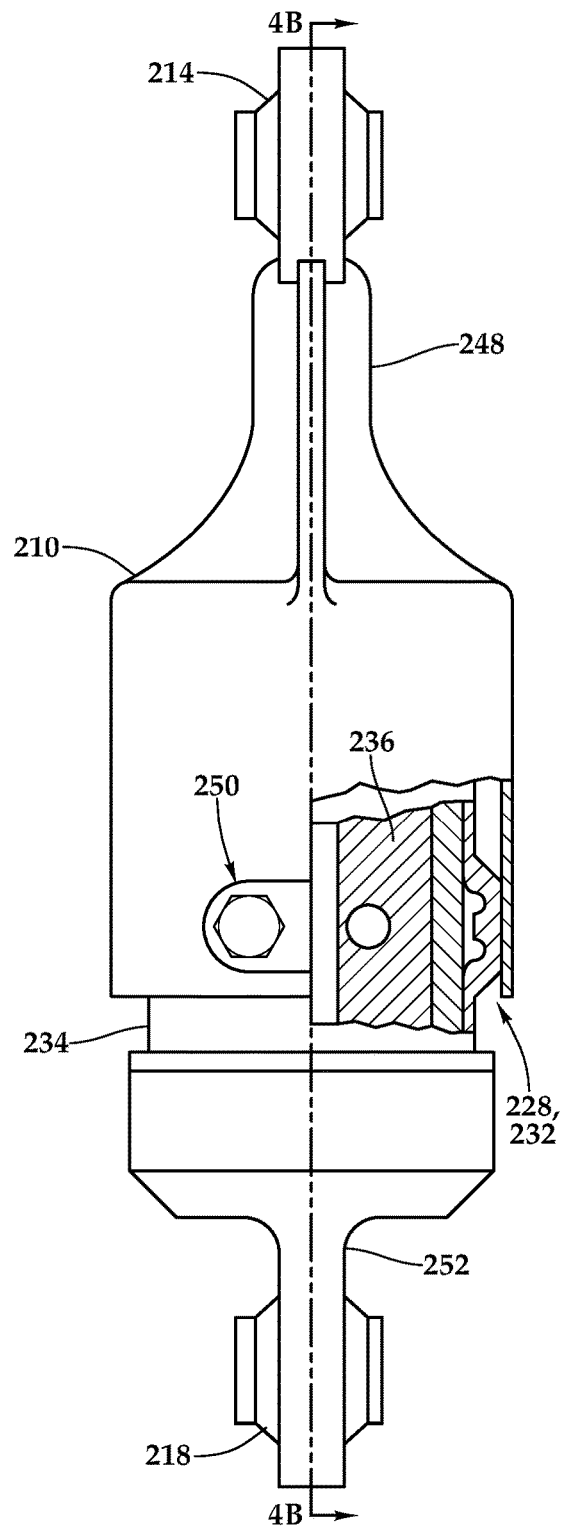
FIGS. 4A-4B are various views of a pylon link having a Liquid Inertia Vibration Eliminator unit in accordance with embodiments of the present disclosure.
Figure 4B:
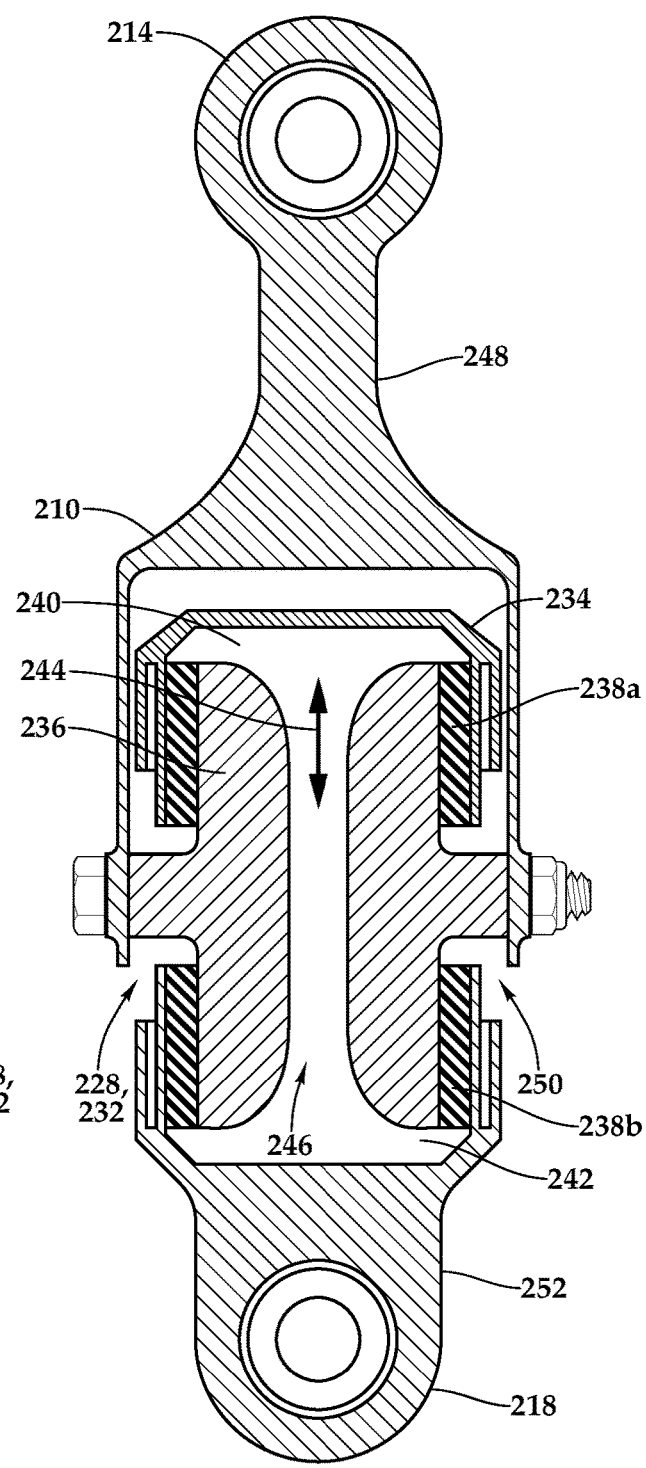

In some embodiments, vibration isolators 228, 230 may be passive vibration isolators, and therefore not require a power source to be operational. With specific reference to FIGS. 4A-4B, in some embodiments pylon link 210 may include a Liquid Inertia Vibration Eliminator (LIVE™) unit 232. Pylon link 210 is substantially similar to pylon link 212 therefore, for sake of efficiency, certain features will be disclosed only with regard to pylon link 210. One having ordinary skill in the art, however, will fully appreciate an understanding of pylon link 212 and any additional pylon links based upon the disclosure herein of pylon link 210. LIVE' unit 232 is a vibration-canceling throughput unit and can take many forms. As best seen in FIG. 4B, which is a cross-sectional view of FIG. 4A taken along line 4B-4B, LIVE™ unit 232 includes a housing 234 that has a hollow, generally cylindrical interior. A piston 236 of a selected cross-sectional diameter is disposed within the interior of housing 234. Elastomeric seal and spring members 238a, 238b resiliently seal piston 236 within the interior of housing 234. A first fluid chamber 240 and a second fluid chamber 242 are defined by the interior of housing 234 and piston 236 and are sealed against leakage by elastomeric seal and spring members 238a, 238b. Tuning fluid, which may be a high density and low viscosity fluid, is disposed within fluid chambers 240, 242. In addition to sealing the tuning fluid and fluid chambers 240, 242, elastomeric seal and spring members 238a, 238b function as a spring to permit piston 236 to move or oscillate in a longitudinal direction indicated by double arrow 244, relative to housing 234, while maintaining piston 236 in a central location in housing 234 when no load is applied. A tuning passage 246 extends centrally through piston 236 and permits the tuning fluid to flow between first fluid chamber 240 and second fluid chamber 242.

A top portion 248 of pylon link 210 may be attached to piston 236 via bracket 250, and a bottom portion 252 of pylon link 210 may be attached to housing 234. In other embodiments, top portion 248 of pylon link 210 may be attached to housing 234, and bottom portion 252 of pylon link 210 may be attached to piston 236. In operation, vibration of pylon assembly 202 at a particular frequency displaces piston 236 relative to housing 234 along double arrow 244. Because the force and displacement is oscillatory over time, piston 236 similarly oscillates relative to housing 234. A displacement of piston 236 causes a displacement of tuning fluid through tuning passage 246 in the opposite direction of the displacement of piston 236. The displacement of piston 236 causes an oscillatory reaction force due to strain and elastomeric seal and spring members 238a, 238b. At the same time, the volumes of tuning fluid in first and second fluid chambers 240, 242 are alternately increased and decreased such that the tuning fluid is pumped back and forth through tuning passage 246. The inertial force created by acceleration of the mass of the tuning fluid is out of phase with the pylon assembly vibration introduced to piston 236 via bracket 250. At an isolation frequency, the force of the mass of the tuning fluid cancels the force introduced to piston 236 via bracket 250, thereby isolating the vibration of pylon assembly 202.

LIVE™ unit 232 is a passive vibration isolator. Passive LIVE™ units are effective at or near a single vibration frequency. In contrast, an active vibration isolation system can be effective over a range of frequencies to accommodate more than just a single isolation frequency, such as when a rotorcraft operates at different rotor speeds or when attempting to reduce the transmission of pylon assembly vibration occurring at multiple frequencies. In some embodiments, LIVE' unit 232 may be an active LIVE' unit, such as by introducing a pump or other technique for actively oscillating or moving the tuning fluid through tuning passage 246. The dynamic response characteristics of an active LIVE™ unit can be altered as desired. An active LIVE™ unit may include active adjustment of the isolation frequency and the frequency response characteristics of the LIVE™ unit. For example, a pressure differential in a LIVE™ unit can be actively adjusted to affect the isolation frequency and frequency response characteristics of the LIVE™ unit. In some embodiments, active pumper devices may use piezoelectric or electromagnetic actuation within the LIVE' unit to oscillate tuning fluid through tuning passage 246 by mechanically activating piston 236. In addition, an electromagnetic pump device, which uses an electric motor to oscillate piston 236 and dynamically displace the tuning fluid, may be used to generate a sinusoidal displacement of tuning fluid. The electric motor speed and sinusoidal displacement amplitude may be controlled to produce the desired quantity of pumped fluid and the frequency of fluid oscillations. Oscillating pumps external to the LIVE™ unit may also be used to introduce oscillating fluid flow to tuning passage 246 of piston 236.

In contrast to the active force generation system described in FIG. 2, vibration isolation system 208 of the illustrative embodiments is lighter, more robust and less prone to failure during flight. Because vibration isolation system 208 is passive and does not need external power, loss of power to vibration isolation system 208 does not affect the vibration isolation capabilities of vibration isolation system 208. Vibration isolation system 208 requires less airframe substantiation and puts less strain on surrounding structure than the active force generation system described in FIG. 2. Because vibration isolation system 208 requires less support equipment, such as an external power supply and controlling devices, vibration isolation system 208 may also be less costly. Because no electronic feedback loop is required to operate vibration isolation system 208, no delayed response occurs when maneuvering through transient flight envelopes.

Referring to FIGS. 5A-5C and 6A-6B in the drawings, a vibration isolation system is schematically illustrated and generally designated 300. Vibration isolation system 300 is implemented on advancing blade concept rotorcraft 302, which includes pylon assembly 304 and airframe 306. Pylon assembly 304 includes dual rotor system 308 and transmission 310, and is subject to vibration along multiple degrees of freedom. Vibration isolation system 300 includes left forward pylon link 312 having central axis 312a, right forward pylon link 314 having central axis 314a, left rear pylon link 316 having central axis 316a, and right rear pylon link 318 having central axis 318a. Pylon links 312, 314, 316, 318 may be structurally coupled between airframe 306 and lug mounts on transmission 310, thereby providing the primary structural support for pylon assembly 304. The operationally induced forward, lateral and torsional motions of pylon assembly 304 may be controlled by lateral pylon link 320 and torque restraint and fore/aft vibration isolation subsystem 322. Torque restraint and fore/aft vibration isolation subsystem 322 includes left fore/aft pylon link 324 and right fore/aft pylon link 326. Pylon links 312, 314, 316, 318, 320, 324, 326 may each isolate or control vibration along one or more degrees of freedom of pylon assembly 304.

Figure 5A:
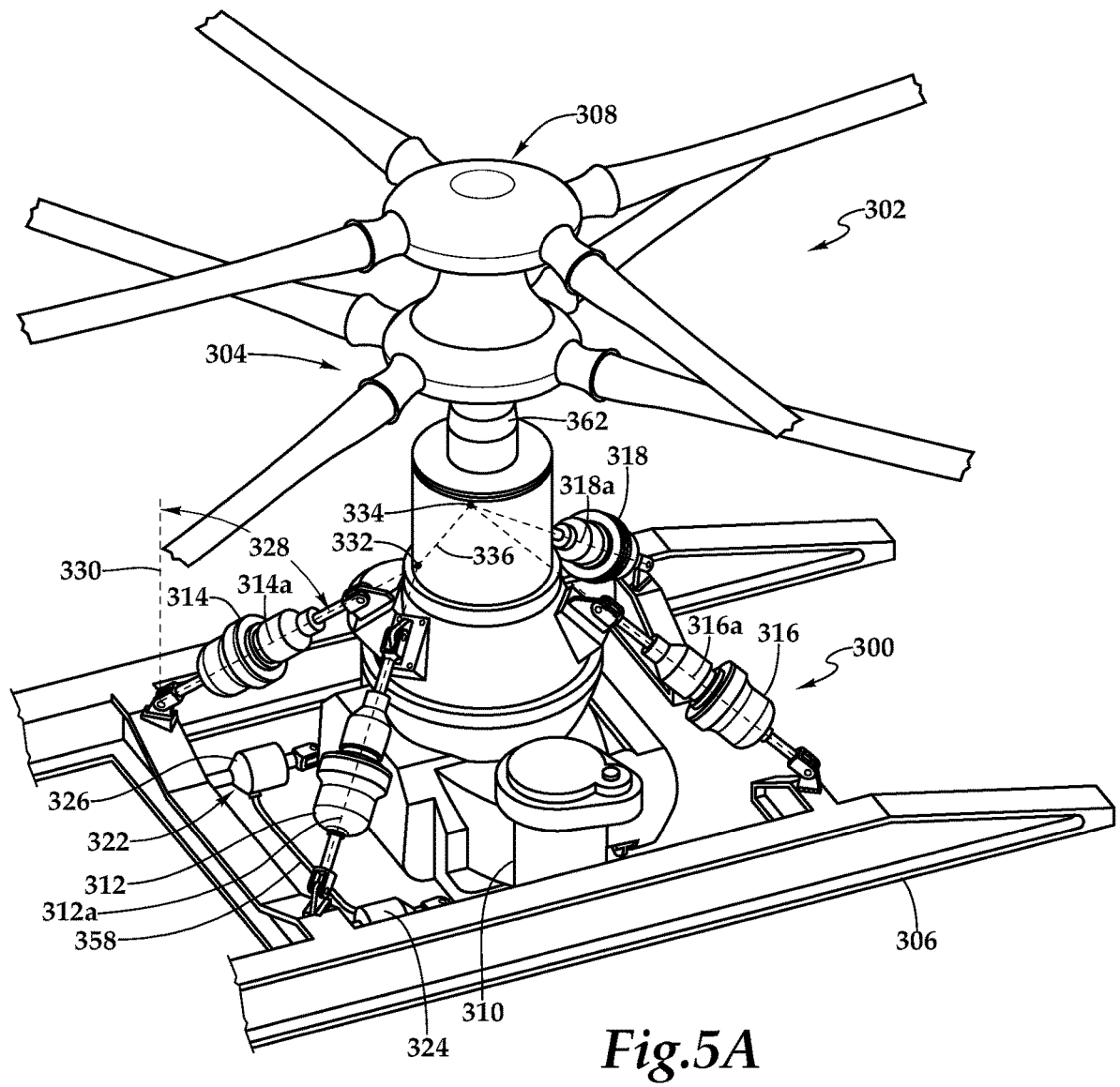
FIGS. 5A-5C are various views of a vibration isolation system implemented on an advancing blade concept rotorcraft in accordance with embodiments of the present disclosure.
Figure 5B:
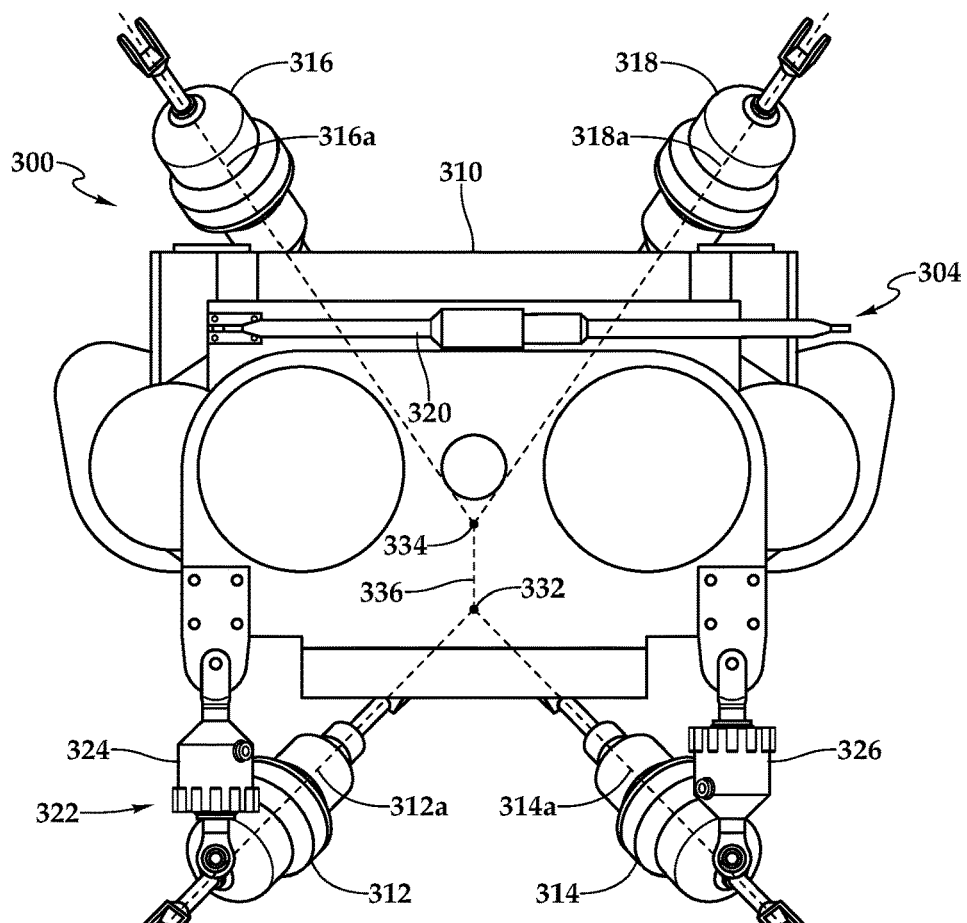

Pylon links 312, 314, 316, 318 are angled pylon links in that each pylon link 312, 314, 316, 318 is neither horizontal nor vertical relative to advancing blade concept rotorcraft 302, but is oriented at some angle therebetween. For example, pylon link 314 may form an angle 328 of between about 20 degrees and 70 degrees with vertical axis 330, which intersects the joint between pylon link 314 and airframe 306. Pylon links 312, 316, 318 may also form such angles with their respective vertical axes. Left forward pylon link 312 and right forward pylon link 314 are oriented such that axes 312a, 314a are non-parallel and converge at a forward focal point 332, thus forming a converging pair of pylon links. Left rear pylon link 316 and right rear pylon link 318 are oriented such that axes 316a and 318a are non-parallel and converge at an aft focal point 334, thus also forming a converging pair of pylon links. Both converging pairs of pylon links 312, 314 and 316, 318 are circumferentially disposed around pylon assembly 304 and, as best seen in FIG. 5B, generally project radially outward from transmission 310.

Aft focal point 334 is located at a higher waterline than forward focal point 332. The distance between forward focal point 332 and aft focal point 334 form a virtual roll axis 336 therebetween. In the illustrated embodiment, both forward focal point 332 and aft focal point 334 lie on a centerline (e.g. zero buttline) of advancing blade concept rotorcraft 302. One advantage of vibration isolation system 300 over conventional mount systems is that by locating forward focal point 332 and aft focal point 334 on different aircraft waterlines, the rolling tendency is substantially decreased. Transmission 310 may have a virtual swing arm between its center of gravity and virtual roll axis 336 with which transmission 310 will have a natural propensity to swing about. However, vibration isolation system 300 is configured such that virtual roll axis 336 is substantially inclined by orienting aft focal point 334 with a substantially higher waterline as compared to forward focal point 332. The inclination of virtual roll axis 336 impedes the swinging of transmission 310, which decreases the loads associated with the swinging of transmission 310.

In the example embodiment, each end of pylon links 312, 314, 316, 318 is coupled to transmission 310 and airframe 306 with spherical bearings to prevent pylon links 312, 314, 316, 318 from reacting to loads in unintended directions. For example, fore/aft loads and torsional loads are not reacted by pylon links 312, 314, 316, 318, but rather by torque restraint and fore/aft vibration isolation subsystem 322. Further, lateral loads are not reacted by pylon links 312, 314, 316, 318, but rather by lateral pylon link 320. Mounting pylon links 312, 314, 316, 318 with spherical bearings helps ensure that each pylon link 312, 314, 316, 318 will only react to loads along its respective axis 312a, 314a, 316a, 318a. Further, prevention of load reaction outside of axes 312a, 314a, 316a, 318a in combination with the freedom to adjust the waterline and fuselage station of forward focal point 332 and aft focal point 334 provide tunability to optimize vibration reduction and reduce the rolling tendency of transmission 310 about virtual roll axis 336.

Pylon links 312, 314, 316, 318, lateral pylon link 320, left fore/aft pylon link 324 and right fore/aft pylon link 326 may each include a vibration isolator. For example, pylon links 312, 314, 316, 318, lateral pylon link 320, left fore/aft pylon link 324 and right fore/aft pylon link 326 may each be "soft" (i.e. not rigid) in that each pylon link may include internal components, such as fluid, orifices, springs, elastomeric members and the like, to isolate vibrations between transmission 310 and airframe 306. Pylon links 312, 314, 316, 318, lateral pylon link 320, left fore/aft pylon link 324 and right fore/aft pylon link 326 may each include a LIVE' unit that is either passive or active.

Figure 5C:
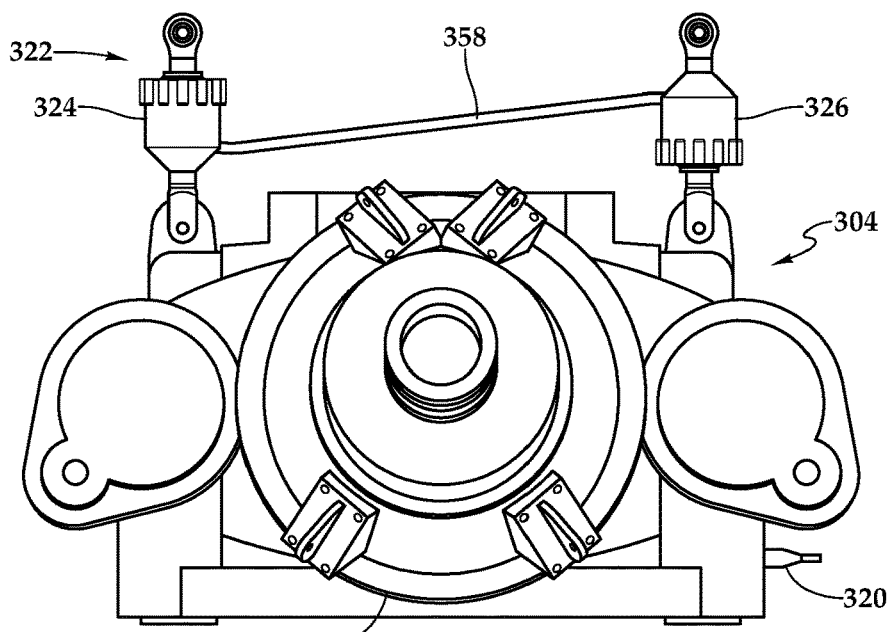
Figure 6A:
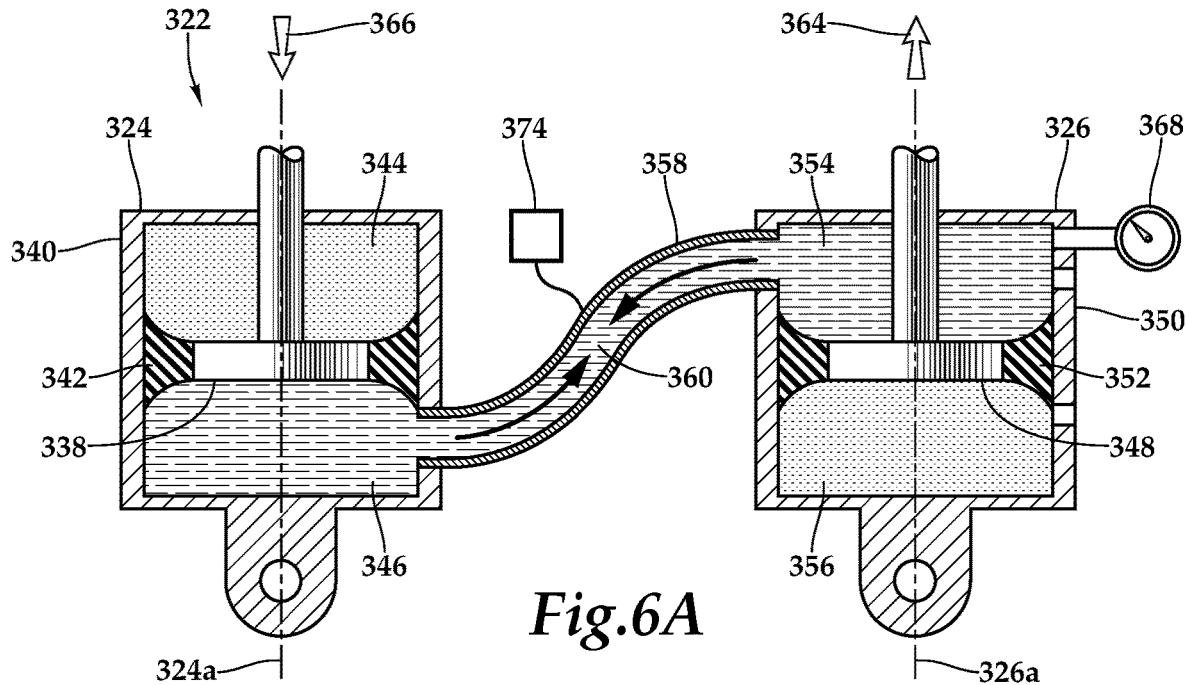
FIGS. 6A-6B are cross-sectional views of a torque restraint and fore/aft vibration isolation subsystem in accordance with embodiments of the present disclosure.
Figure 6B:
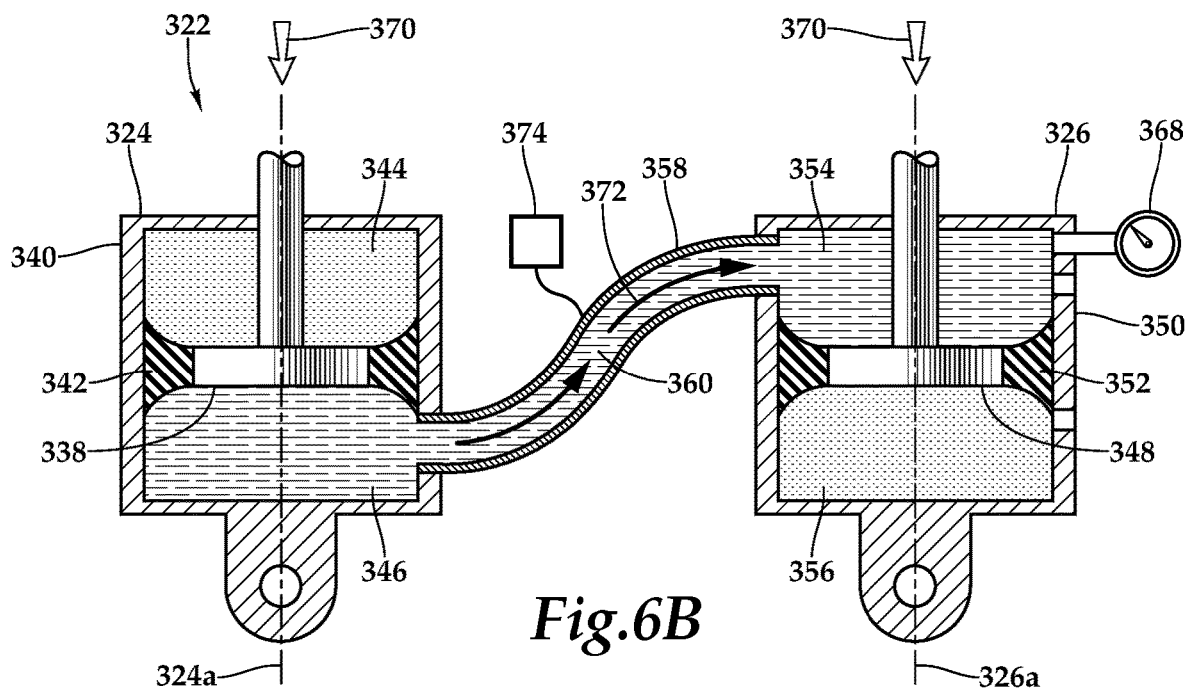

With specific reference to FIGS. 5C and 6A-6B, torque restraint and fore/aft vibration isolation subsystem 322 is illustrated in further detail. Torque restraint and fore/aft vibration isolation subsystem 322 has a substantially horizontal orientation relative to advancing blade concept rotorcraft 302. Torque restraint and fore/aft vibration isolation subsystem 322, including left fore/aft pylon link 324 and right fore/aft pylon link 326, collectively provides not only torque restraint, but also torque measurement and fore/aft vibration isolation. Torque restraint and fore/aft vibration isolation subsystem 322 may be particularly well suited to accompany a primary vibration isolation system, such as pylon links 312, 314, 316, 318 that are configured to not react to fore/aft loads and torque loads. However, it should be appreciated that torque restraint and fore/aft vibration isolation subsystem 322 may accompany a vibration isolation system having any number of pylon links oriented in a variety of different orientations.

Left fore/aft pylon link 324 has a piston 338 resiliently coupled to a housing 340 with an elastomeric member 342. Piston 338 and elastomeric member 342 divide housing 340 into a first chamber 344 and a second chamber 346. Similarly, right fore/aft pylon link 326 has a piston 348 resiliently coupled to a housing 350 with an elastomeric member 352. Piston 348 and elastomeric member 352 divide housing 350 into a first chamber 354 and a second chamber 356. Second chamber 346, first chamber 354 and a fluid line 358 are filled with a fluid 360. First chamber 344 and second chamber 356 do not require fluid 360 and thus can be open or vented rather than being enclosed chambers. For example, first chamber 344 and second chamber 356 can be filled with air, or open/vented to atmosphere.

In operation, torque restraint and fore/aft vibration isolation subsystem 322 is configured to resist or react to torque loads and measure torque loads, as well as attenuate vibration in the fore/aft direction. Referring in particular to FIG. 6A, torque restraint and fore/aft vibration isolation subsystem 322 is illustrated with regard to the reaction and measurement of torque loads. During operation of advancing blade concept rotorcraft 302, some torque or torsional vibration may be carried in mast 362 and into transmission 310. Various maneuvers and operations of advancing blade concept rotorcraft 302 can cause the amount of torque to vary significantly. Pylon links 312, 314, 316, 318 are configured to not react to torque, thus the torque experienced by transmission 310 is reacted to by left fore/aft pylon link 324 and right fore/aft pylon link 326. Preferably, left fore/aft pylon link 324 and right fore/aft pylon link 326 are mounted with spherical bearings so that the torque load is substantially realized as a forward directional load 364 along axis 326a and aft direction load 366 along axis 324a. Forward directional load 364 attempts to pull piston 348 forward, but the equal and opposite aft directional load 366 attempts to push piston 338, thereby creating a fluid lock since fluid 360 in second chamber 346 is in fluid communication with fluid 360 in first fluid chamber 354 via fluid line 358. As such, the torque is restrained with a stiffness that is dependent upon the bulk modulus, or stiffness, of the implementation-specific fluid 360. Furthermore, the amount of torque reacted to by left fore/aft pylon link 324 and right fore/aft pylon link 326 may be measured by a pressure sensor 368. Pressure sensor 368 may be in communication with one or more processors for analysis. In another embodiment, pressure sensor 368 is in communication with a visual gauge in the cockpit of advancing blade concept rotorcraft 302 so that the operator can evaluate the torque in real time. It should be appreciated that the direction of forward directional load 364 and aft direction load 366 can be directionally reversed to accommodate torsional vibrations in both directions.

With specific reference to FIG. 6B, torque restraint and fore/aft vibration isolation subsystem 322 is illustrated with regard to the isolation of oscillatory vibration of pylon assembly 304 in the fore/aft direction. Oscillatory vibration loads can be generated during operation, some of which may have a fore/aft component. An oscillatory load left untreated would be realized as a vibration in advancing blade concept rotorcraft 302. For illustrative purposes, the oscillatory load is schematically shown in an aft direction by arrows 370. However, it should be appreciated that the load oscillates in the fore/aft direction at a certain frequency. When the load is in the aft direction, shown by arrows 370, pistons 338 and 348 are pushed aft, which decreases the volume of fluid 360 in second chamber 346 and increases the volume of fluid 360 in first chamber 354, thereby creating a net shift in fluid 360 in a forward direction 372. The axial shift in fluid 360 acts to cancel the load input in that the mass of the fluid shift creates an inertial mass cancellation of the input. Since the fore/aft load oscillates fore/aft at a certain frequency, torque restraint and fore/aft vibration isolation subsystem 322 employs the principle that the acceleration of an oscillating mass is 180 degrees out of phase with its displacement. Fluid line 358 acts as an inertia track and can be tuned so that torque restraint and fore/aft vibration isolation subsystem 322 attenuates vibration at a desired frequency. Further, if the fore/aft oscillatory load varies, then an optional active pumper 374 can be utilized to actively adjust the isolation frequency by imparting pumping fluid 360 at a frequency that adjusts the isolation frequency.

Figure 7:
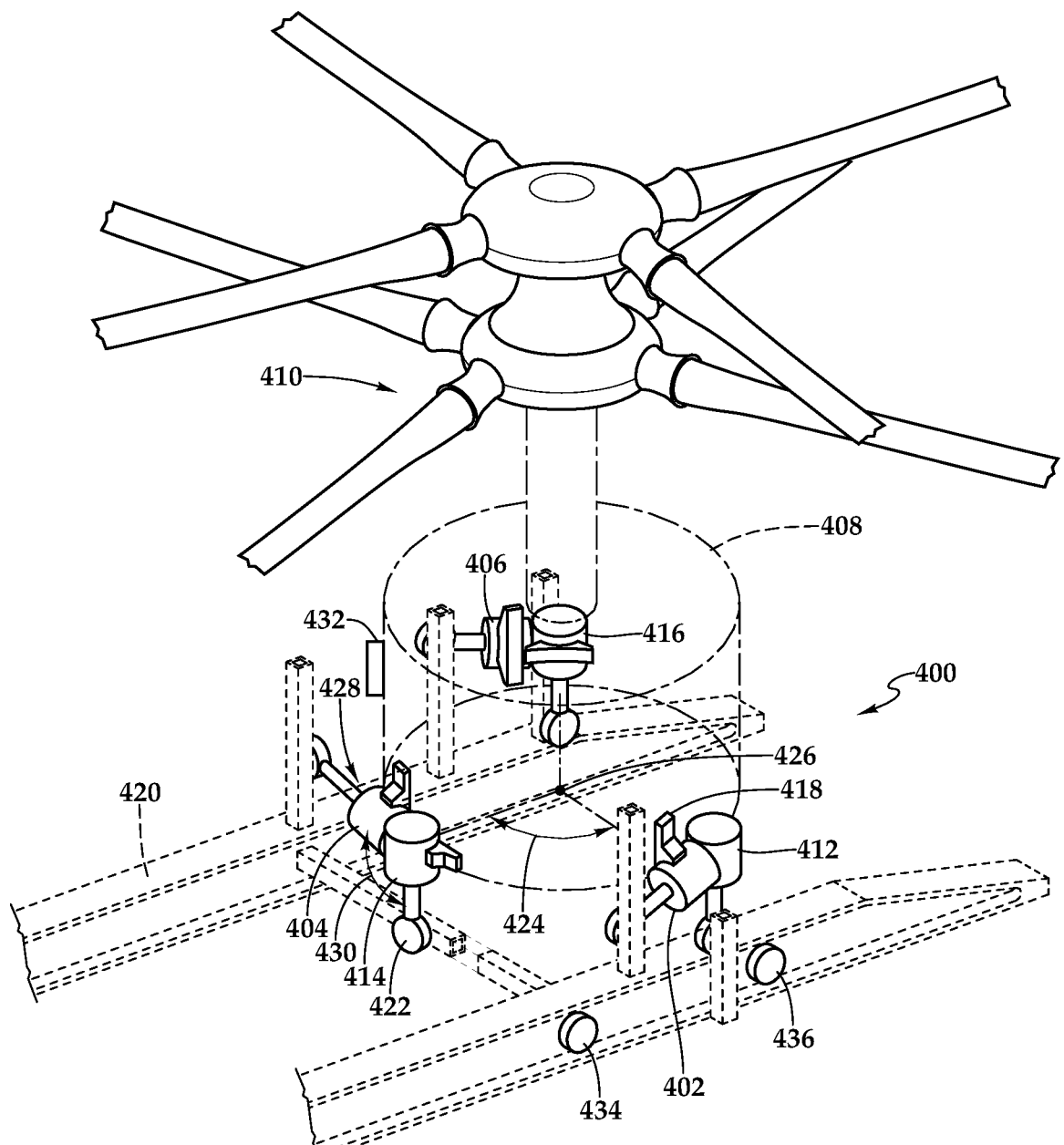
FIG. 7 is an isometric view of a vibration isolation system implemented on an advancing blade concept rotorcraft in accordance with embodiments of the present disclosure.

Referring to FIGS. 7, 8 and 9A-9B in the drawings, vibration isolation systems implemented on an advancing blade concept rotorcraft in various configurations are schematically illustrated. The vibration isolation systems in FIGS. 7, 8 and 9A-9B are each configured to isolate vibration of a pylon assembly along multiple degrees of freedom, and are exemplary of the wide range of configurations in which the illustrative embodiments may be implemented. In FIG. 7, vibration isolation system 400 includes substantially horizontal pylon links 402, 404, 406 circumferentially disposed around transmission 408 of pylon assembly 410. Horizontal pylon links 402, 404, 406 may each, in some embodiments, be angularly offset from the horizontal plane within a range of between 0 and 20 degrees. Vibration isolation system 400 also includes substantially vertical pylon links 412, 414, 416 circumferentially disposed around transmission 408. Horizontal and vertical pylon links 402, 404, 406, 412, 414, 416 each include a vibration isolator (not shown), such as a LIVE™ unit. One end of each horizontal and vertical pylon link 402, 404, 406, 412, 414, 416 may be coupled to transmission 408 using brackets 418 while the opposite end of each pylon link 402, 404, 406, 412, 414, 416 is coupled to airframe 420 using fuselage or airframe attachment bearings 422. Vertical pylon links 412, 414, 416 may be circumferentially equidistant from one another such that adjacent vertical pylon links form an approximately 120 degree angle 424 with a vertex located at central axis 426 of pylon assembly 410. Each pair 428 of horizontal and vertical pylon links, such as horizontal pylon link 404 and vertical pylon link 414, forms an angle 430 therebetween in a range between 70 and 110 degrees. The configuration of vibration isolation system 400 may be particularly useful for pylon assemblies having high nodal points. In some embodiments, vertical pylon links 412, 414, 416 may control vertical vibration of pylon assembly 410 while horizontal pylon links 402, 404, 406 control torsional vibration and horizontal, including lateral and longitudinal, vibration of pylon assembly 410.

Vibration isolation system 400 may be used in conjunction with one or more active force generators 432, 434, 436. Active force generators 432, 434, 436 are operable to produce a force that counteracts the vibration of pylon assembly 410, thereby reducing vibration of the advancing blade concept rotorcraft. Active force generators 432, 434, 436 may be linear force generators, circular or rotary force generators or other suitable force generators. For example, active force generators 432, 434, 436 may be spring masses or shakers, including rotary hub-mounted shakers. It will be understood by one of ordinary skill in the art that the types of active force generators that may be implemented in vibration isolation system 400 are numerous, and that each of these types of active force generators may be implemented, in any combination, simultaneously with the illustrative embodiments.

Figure 8:
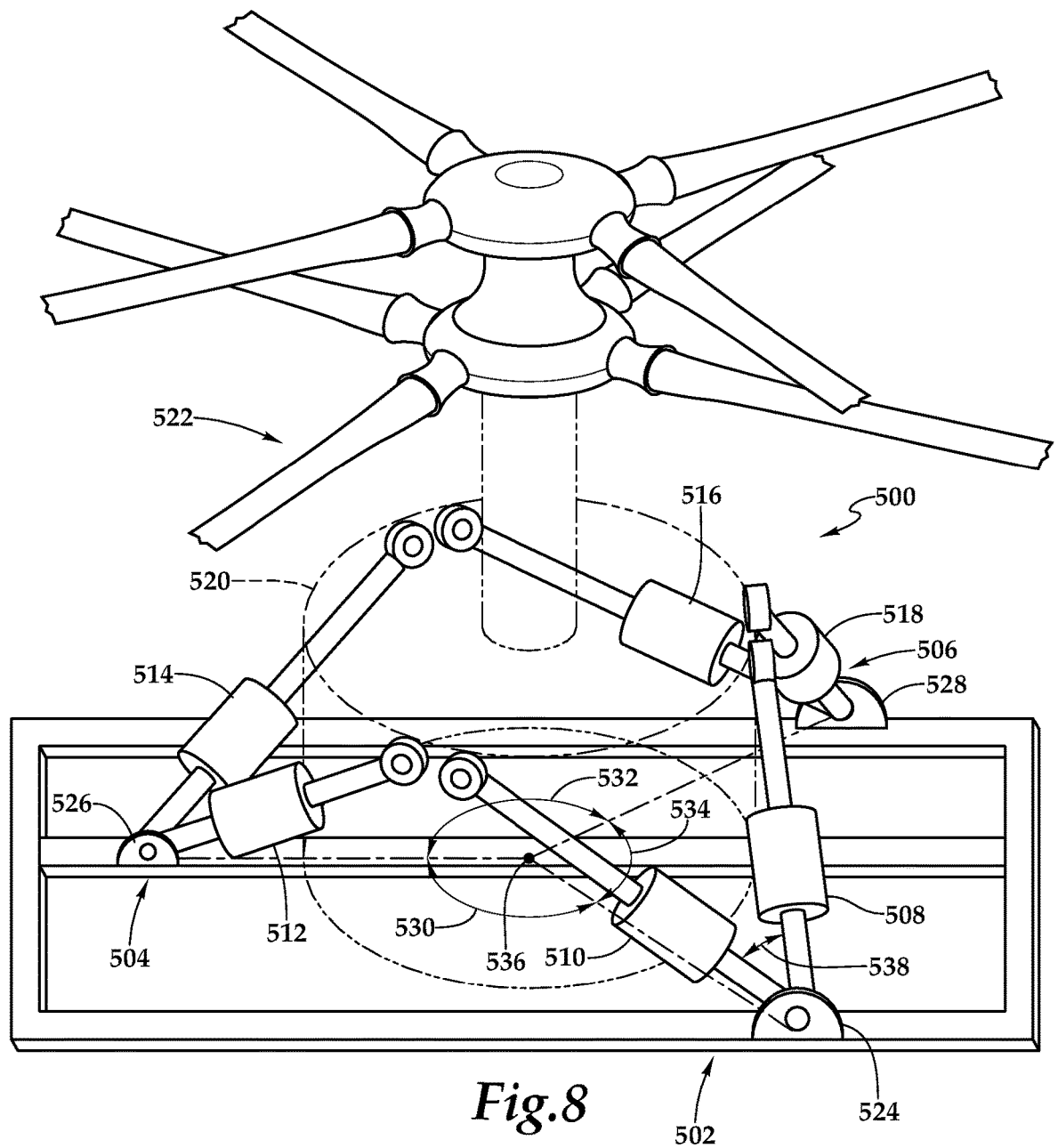
FIG. 8 is an isometric view of a vibration isolation system implemented on an advancing blade concept rotorcraft in accordance with embodiments of the present disclosure.

In FIG. 8, vibration isolation system 500 includes three converging pairs 502, 504, 506 of angled pylon links 508, 510, 512, 514, 516, 518 circumferentially disposed around transmission 520 of pylon assembly 522. Each pylon link 508, 510, 512, 514, 516, 518 includes a vibration isolator (not shown), such as a LIVE' unit. Each converting pair 502, 504, 506 includes two non-parallel pylon links 508 and 510, 512 and 514, 516 and 518 that converge at airframe connections 524, 526, 528, respectively. In some embodiments, airframe connections 524, 526, 528 may be circumferentially non-equidistant from one another such that angles 530 and 532 are each larger than angle 534, with central axis 536 of pylon assembly 522 acting as the vertex. In one non-limiting example, angles 530, 532 are each approximately 135 degrees and angle 534 is approximately 90 degrees. Angle 538 between the pylon links of each convergent pair 502, 504, 506 may be any acute angle. Vibration isolation system 500 may be particularly useful when implemented on pylon assemblies having high nodal points.

Figure 9A:
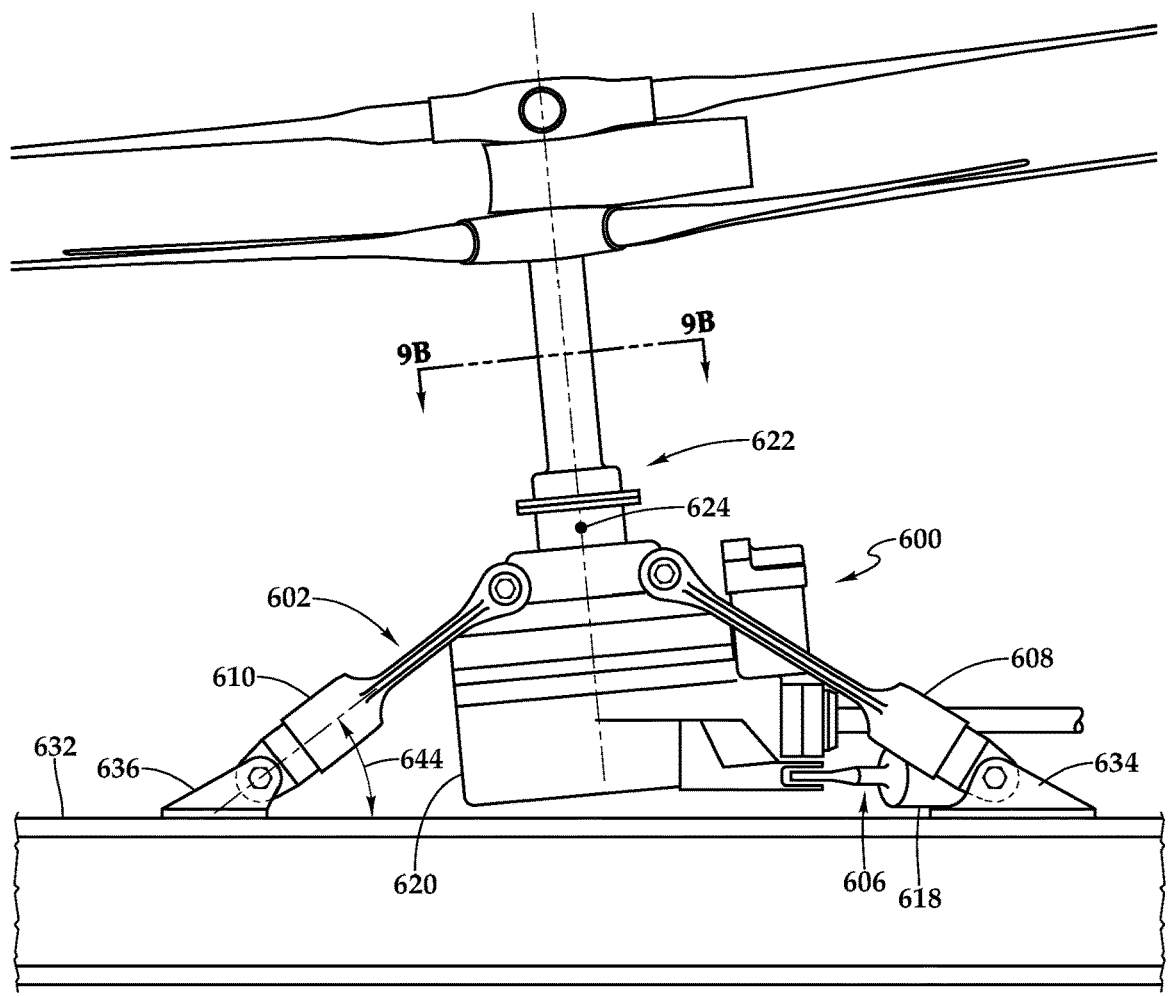
FIGS. 9A-9B are various views of a vibration isolation system implemented on an advancing blade concept rotorcraft in accordance with embodiments of the present disclosure.
Figure 9B:
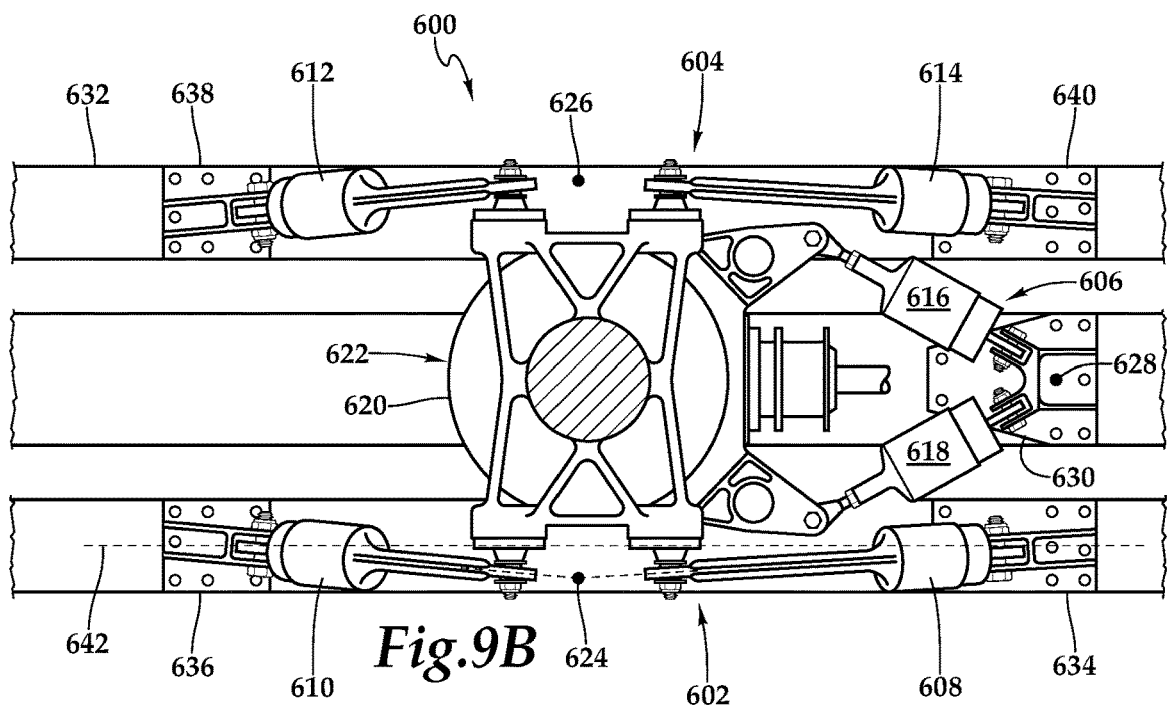

In FIGS. 9A-9B, vibration isolation system 600 includes three converging pairs 602, 604, 606 of angled pylon links 608, 610, 612, 614, 616, 618 circumferentially disposed around transmission 620 of pylon assembly 622. Each pylon link 608, 610, 612, 614, 616, 618 includes a vibration isolator (not shown), such as a LIVE' unit. Converging pairs 602, 604, 606 each include two pylon links that are non-parallel and have axes that converge at a focal point. In particular, converging pairs 602, 604, 606 converge at focal points 624, 626, 628, respectively. Focal point 628 at which pylon links 616, 618 converge is located at pylon support fitting 630, which anchors pylon links 616, 618 to airframe 632. Focal points 624, 626 of converging pairs 602, 604, respectively, have higher waterlines located at or near the top of transmission 620. Pylon links 608, 610, 612, 614 are each anchored to airframe 632 using pylon support fittings 634, 636, 638, 640, respectively. Pylon support fittings 634 and 636, 638 and 640 corresponding to each converging pair 602, 604, respectively, are substantially collinear along a fore/aft axis of the advancing blade concept rotorcraft. For example, pylon support fittings 634, 636 of converging pair 602 are substantially collinear along fore/aft axis 642. Pylon links 608, 610, 612, 614 may each form any acute angle 644 with airframe 632. Pylon links 616, 618 may be particularly adapted to control vibration of pylon assembly 622 in the fore/aft and lateral directions, while pylon links 608, 610, 612, 614 control vibration in the remaining degrees of freedom.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An advancing blade concept rotorcraft comprising:
    an airframe;
    a pylon assembly subject to vibration, the pylon assembly including a dual rotor system having coaxially disposed top and bottom rotor assemblies that counter rotate relative to one another;
    a vibration isolation system including at least one pylon link coupled to the airframe and the pylon assembly, the at least one pylon link each including a Liquid Inertia Vibration Eliminator unit operable to reduce transmission of the pylon assembly vibration to the airframe; and
    a plurality of active force generators adjacent to the pylon assembly, the plurality of active force generators including a first active force generator producing a force in a first direction and a second active force generator producing a force in a second direction different from the first direction to counteract multidirectional oscillations of the pylon assembly, thereby reducing vibration of the advancing blade concept rotorcraft.

2. The advancing blade concept rotorcraft as recited in claim 1 wherein the counter rotating rotor assemblies combine harmonics in the wakes of one another to emit a dual rotor system vibration frequency; and
    wherein the Liquid Inertia Vibration Eliminator unit is tuned to cancel the dual rotor system vibration frequency originating from the dual rotor system.

3. The advancing blade concept rotorcraft as recited in claim 1 wherein the pylon assembly further comprises a transmission; and
    wherein the at least one pylon link is coupled to the transmission.

4. The advancing blade concept rotorcraft as recited in claim 1 wherein the Liquid Inertia Vibration Eliminator unit is a passive Liquid Inertia Vibration Eliminator unit.

5. The advancing blade concept rotorcraft as recited in claim 1 wherein the Liquid Inertia Vibration Eliminator unit is an active Liquid Inertia Vibration Eliminator unit.

6. The advancing blade concept rotorcraft as recited in claim 1 wherein the Liquid Inertia Vibration Eliminator unit includes:
    first and second fluid chambers;
    a tuning passage providing fluid communication between the first and second fluid chambers;
    a tuning fluid moveable between the first and second fluid chambers via the tuning passage to isolate the vibration of the pylon assembly; and
    a housing and a piston disposed within the housing, the piston forming the tuning passage.

7. The advancing blade concept rotorcraft as recited in claim 6 wherein the piston is operable to move within the housing such that the tuning fluid moves between the first and second fluid chambers via the tuning passage in response to the vibration of the pylon assembly.

8. The advancing blade concept rotorcraft as recited in claim 6 wherein the at least one pylon link further comprises a first portion including a first end and a second portion including a second end; and
    wherein the first portion of the at least one pylon link is coupled to one of the housing or the piston and the second portion of the at least one pylon link is coupled to the other of the housing or the piston.

9. The advancing blade concept rotorcraft as recited in claim 1 wherein the at least one pylon link further comprises at least one substantially horizontal pylon link and at least one substantially vertical pylon link.

10. The advancing blade concept rotorcraft as recited in claim 1 wherein the at least one pylon link comprises a plurality of pylon links each including a respective Liquid Inertia Vibration Eliminator unit;
    wherein the pylon assembly is subject to vibration in a plurality of degrees of freedom including first and second degrees of freedom; and
    wherein the plurality of pylon links include first and second pylon links, the first pylon link oriented to isolate vibration of the pylon assembly in the first degree of freedom, the second pylon link oriented to isolate vibration of the pylon assembly in the second degree of freedom.

11. The advancing blade concept rotorcraft as recited in claim 10 wherein the plurality of pylon links further comprise a plurality of substantially horizontal pylon links circumferentially disposed around the pylon assembly and a plurality of substantially vertical pylon links circumferentially disposed around the pylon assembly.

12. The advancing blade concept rotorcraft as recited in claim 11 wherein the plurality of vertical pylon links are circumferentially equidistant from one another.

13. The advancing blade concept rotorcraft as recited in claim 11 wherein the plurality of pylon links further comprise pairs of substantially horizontal pylon links and substantially vertical pylon links, each pair of horizontal and vertical pylon links forming an angle between 70 and 110 degrees.

14. The advancing blade concept rotorcraft as recited in claim 11 wherein at least one of the horizontal pylon links is angularly offset from a horizontal plane.

15. The advancing blade concept rotorcraft as recited in claim 1 wherein the at least one pylon link further comprises a torque restraint and fore/aft vibration isolation subsystem.

16. The advancing blade concept rotorcraft as recited in claim 1 wherein the plurality of active force generators are coupled to the airframe.

17. The advancing blade concept rotorcraft as recited in claim 1 wherein the plurality of active force generators include at least one rotary active force generator.

18. The advancing blade concept rotorcraft as recited in claim 1 wherein the first active force generator produces a force in a vertical direction, the second active force generator produces a force in a longitudinal direction and a third active force generator produces a force in a lateral direction to produce forces to counteract the multidirectional oscillations of the pylon assembly, thereby reducing vibration of the advancing blade concept rotorcraft.

19. The advancing blade concept rotorcraft as recited in claim 1 further comprising:
   a pusher propeller having variable pitch blades configured to propel the advancing blade concept rotorcraft in a forward direction; and
   a flight control system having a fly-by-wire architecture;
   wherein the top and bottom rotor assemblies are rigid rotor assemblies;
   wherein the top and bottom rotor assemblies are variable speed rotor assemblies; and
   wherein the top and bottom rotor assemblies each include four rotor blades.

20. The advancing blade concept rotorcraft as recited in claim 1 further comprising a tailboom including a downward fin and a horizontal stabilizer.

\* \* \* \* \*